United States Patent
Yilmaz et al.

(10) Patent No.: US 11,919,973 B2
(45) Date of Patent: Mar. 5, 2024

(54) METHOD OF PRODUCING BIOPLASTIC GRANULES FROM OLIVE PIT WASTE (PRINA)

(71) Applicants: YILDIZ TEKNIK UNIVERSITESI, Istanbul (TR); BIOLIVE BIYOLOJIK VE KIMYASAL TEKNOLOJILER SANAYI VE TICARET ANONIM SIRKETI, Istanbul (TR)

(72) Inventors: Duygu Yilmaz, Istanbul (TR); Ahmet Fatih Ayas, Istanbul (TR); Mehmet Emin Oz, Istanbul (TR)

(73) Assignees: YILDIZ TEKNIK UNIVERSITESI, Istanbul (TR); BIOLIVE BIYOLOJIK VE KIMYASAL TEKNOLOJILER SANAYI VE TICARET ANONIM SIRKETI, Istanbul (TR)

( * ) Notice: Subject to any disclaimer, the term of this patent is extended or adjusted under 35 U.S.C. 154(b) by 670 days.

(21) Appl. No.: 17/257,008

(22) PCT Filed: May 5, 2020

(86) PCT No.: PCT/TR2020/050380
§ 371 (c)(1),
(2) Date: Dec. 30, 2020

(87) PCT Pub. No.: WO2020/226590
PCT Pub. Date: Nov. 12, 2020

(65) Prior Publication Data
US 2021/0179737 A1    Jun. 17, 2021

(30) Foreign Application Priority Data
May 7, 2019    (TR) .................. 2019/06799

(51) Int. Cl.
| | | |
|---|---|---|
| C08B 1/00 | (2006.01) |
| C08J 3/12 | (2006.01) |
| C08L 97/02 | (2006.01) |
| D21C 1/06 | (2006.01) |

(52) U.S. Cl.
CPC ............... *C08B 1/00* (2013.01); *C08J 3/12* (2013.01); *C08L 97/02* (2013.01); *D21C 1/06* (2013.01); *C08J 2300/16* (2013.01); *C08J 2301/02* (2013.01); *C08J 2397/02* (2013.01); *C08J 2401/02* (2013.01); *C08J 2497/02* (2013.01)

(58) Field of Classification Search
CPC .. C08B 1/00; C08J 3/12; C08J 2300/16; C08J 2301/02; C08J 2397/02; C08J 2401/02; C08J 2497/02; C08L 97/02; C08L 1/02; C08L 97/005; C08L 99/00; C08L 101/16; C08L 5/14; D21C 1/06; C08K 5/0058; C08K 5/053; C08H 99/00
See application file for complete search history.

(56) References Cited

U.S. PATENT DOCUMENTS

| | | | |
|---|---|---|---|
| 7,538,236 B2 | 5/2009 | Narine et al. |
| 2018/0079871 A1 | 3/2018 | Tudman |

FOREIGN PATENT DOCUMENTS

| | | |
|---|---|---|
| CN | 104829902 A | 8/2015 |
| EP | 3305855 A2 | 4/2018 |
| ES | 2185796 T3 | 5/2003 |
| ES | 2383383 A1 | 6/2012 |
| KR | 20190021961 A | 3/2019 |
| WO | 2018021980 A1 | 2/2018 |

OTHER PUBLICATIONS

Asma Boudria et al., Effect of filler load and high-energy ball milling process on properties of plasticized wheat gluten/olive pomace biocomposite, Advanced Powder Technology, 2018, pp. 1230-1238, 29.
A.F. Koutsomitopoulou et al., Preparation and characterization of olive pit powder as a filler to PLA-matrix bio-composites, Powder Technology, 2014, pp. 10-16, 255.
https://www.youtube.com/watch?v=900SPJKTy0A, Mar. 22, 2016.

*Primary Examiner* — Eric Hug
*Assistant Examiner* — Matthew M Eslami
(74) *Attorney, Agent, or Firm* — Bayramoglu Law Offices LLC

(57) ABSTRACT

A method for producing bioplastic granules includes the steps of subjecting an olive pit waste (prina) from olive oil factories to two different chemical shredding processes, extracting a necessary material for a bioplastic production from a shredded olive pit waste and adding natural polymerizer form holders into the necessary material.

7 Claims, No Drawings

METHOD OF PRODUCING BIOPLASTIC GRANULES FROM OLIVE PIT WASTE (PRINA)

CROSS REFERENCE TO THE RELATED APPLICATIONS

This application is the national stage entry of International Application No. PCT/TR2020/050380, filed on May 5, 2020, which is based upon and claims priority to Turkish Patent Application No. 2019/06799, filed on May 7, 2019, the entire contents of which are incorporated herein by reference.

TECHNICAL FIELD

The invention relates to a method of producing bioplastic granule from olive pit waste.

More specifically, the invention relates to a method for producing bioplastic granules comprising the steps of subjecting olive pit wastes from olive oil factories to two different chemical shredding processes, taking the necessary material for bioplastic production from the shredded olive pit waste and adding natural polymerizer form holders into it.

BACKGROUND

Plastics are not readily available in nature, they are obtained by reacting monomers with elements in nature at a certain temperature and pressure by using catalysts. Plastics are produced from materials left over from crude oil used in oil refineries. Most petroleum sources are used in plastic production processes. Since existing plastics are also derived from petroleum, they both consume petroleum sources and they do not decompose for 450 years when thrown as waste, in the environment. Therefore, scientists have developed bioplastics from cellulosic materials. However, bioplastics are expensive for our country and more costly than plastics available in the world. As they are expensive, unconscious consumers prefer inexpensive petroleum-derived plastics, and bioplastics have not been used in all sectors and are still unknown in many countries. Also, another problem besides pollution in the world is food waste. There are no plastics that increase the shelf life of food, while being compatible with food at the same time. As a result, food waste increases day by day, and human health is negatively affected by harmful food preservatives that increase the shelf life of food. In addition, even if the existing bioplastics producers aim to match plastic compatibility with the earth, they can produce restricted plastics that are compatible with plastic sectors, since they cannot produce plastic with the desired properties. Because of all of these damages of petroleum-derived plastics, scientists developed bioplastics years ago. Only plastics could be obtained from petroleum derivatives before bioplastics were found. Bioplastics, on the other hand, are formed mainly with cellulosic material.

Various improvements related to bioplastics production have been made in the art.

The Spanish patent document Numbered ES2185796 of the prior art, discloses a method developed for separating polyhydroxyalkanoate from the biomass. The method includes the step of extracting polyhydroxyalkanoate with at least one PHA solvent selected from the group including acetone, acetonitrile, benzene, butyl acetate, butyl propionate, beta-butyrolactone and gamma. The developed method enables bioplastics to be obtained in a simple, environmentally friendly and economical way to recover them from biological sources.

In the Spanish patent document Numbered ES2383383, which is issued as an additional patent application to the Spanish patent document Numbered ES2185796 of the prior art, biomass with high fat content such as olives are used to obtain PHA. The resulting PHA is used to produce bioplastics.

In the U.S. Pat. No. 7,538,236 of the prior art, a method developed for obtaining agricultural raw materials from monomers and polymers is mentioned. The method comprises the steps of; dissolving the raw material in a solvent of ethyl acetate to form a solution there from, feeding the raw material with ozone to perform ozonolysis of two or more double bonds in unsaturated fatty acids of one or more triglycerols, subjecting the solution to direct reducing hydrogenation to produce one or more polyols. It is mentioned that the agricultural raw materials used in the method are vegetable oils such as olive oil.

The Chinese patent document CN104829902, of the prior art, discloses the production of biodegradable plastic. The biodegradable plastic that is developed comprises 20-30 shell powder, 5-10 potato starch, 3-5 soy powder, 3-5 rice bran powder, 5-10 corn cobs, 3-5 cotton seeds, 3-5 gypsum powder, 0.1-0.2 lecithin, 1-2 maltodextrin, 10-15 polyethylene, and 4-8 olive oil by weight.

However, since the bioplastics in the art cannot withstand very intense heat, they cannot be used in all areas and their costs are high. Therefore, there is a need to develop a method for producing bioplastic granule from olive pit waste (prina).

SUMMARY

The object of the present invention is to develop a method for producing bioplastic granules from olive pit waste (prina).

Another object of the invention is to realize the production method of natural, additive-free and environmentally friendly bioplastic granules.

Another object of the present invention is the realization of the method for bioplastic granule production that reduces food waste and increases the shelf life of food.

500.000 tons of olive pit waste is exposed as waste every year in Turkey. In the world, approximately 6 million tons of olive pit waste (prina) is exposed. In the invention developed, these wastes, which are a major problem for olive oil factories, are taken and are turned into bioplastic granules, and are subjected to plastic injection and processed. The most significant difference of the invention from petroleum-derived plastics is that it protects human and environmental health by producing plastic granules without using chemicals.

The most important difference of the developed method from the methods available in the art is that; olive pit wastes from olive oil factories are subjected to two different shredding processes, and the cellulose required for bioplastic production is extracted from the shredded olive pit waste, afterwards, natural polymerizer form holders are added. Thus, heat-resistant bioplastics are produced.

DETAILED DESCRIPTION OF THE EMBODIMENTS

The invention is a method for producing bioplastic granules comprising the steps of;
 mixing the dry prina obtained from the olive oil factory with NaOH solution in the reactor,
 cooling the mixture contained in the reactor, obtaining solid cellulose by separating, by means of a filtering method, the hemicellulose and lignin structure available in a dissolved state in the NaOH solution that are obtained from olive pits and are available in the cooled mixture, washing the resulting solid cellulose with distilled water, mixing cellulose with $H_2SO_4$ and mixing it in the reactor, cooling the mixture, separating the cellulosic part, which is the pellet part in the mixture, and the shredded, dissolved cellulose part, which can be polymerized, from each other, by using filtering paper after the cooling process, transferring the separated liquid component to glass beakers, adding glycerin or sorbitol and antimicrobial agent (oleuropein) and placing them in the heater, subjecting the cellulose to polymerization reaction leaving the pulp structure obtained to cooling, drying the product in an oven after cooling of said product that has been left to cool at room temperature.

The final end product obtained resists temperatures up to 140° C.

The process steps in the developed method are described in detail below.

Raw Material: Olive Pit Waste (Prina):

As the beginning of the method, 4 kg of dry prina from the olive oil factories is weighed on the scales. Prina, which is called olive pit waste, is the most important raw material source for the invention. Obtaining olive pits from different regions and different districts is important for the yield of the product in terms of cellulosic structure and antioxidant substance in the waste.

Treating Dry Prina (Olive Pit Waste) with Sodium Hydroxide:

The weighed dry prina is mixed with 0.9 M 16L NaOH solution and then the next step of processing with the reactor is carried out.

Obtaining Cellulose in a Reactor Where the Temperature and Pressure are Gradually Observed: 4 kg of prina and 0.9 M 16 L NaOH solution is transferred to the reactor. The temperature in the reactor is gradually increased to 150° C. Pressure increase is observed with the increase in temperature. The pressure is raised to 9.5 bars and is fixed at 9.5 bars. During the entire process, the mixer of the reactor is operated. The reactor is operated at 150° C. and 9.5 bar pressure and cooling is performed after separation. The hemicellulose and lignin structure, that is obtained from olive pits, and that dissolves in NaOH solution is separated from the cellulose in solid form by the filtration method. The reason for this is that, the polymerization degree of hemicellulose is lower than that of cellulose. The solid cellulose portion is washed with distilled water after filtration.

Providing Degradation of the Obtained Cellulose in the Reactor:

The resulting solid cellulose part is combined and treated with 0.52 M 8 L $H_2SO_4$ and processed by gradual heating in the reactor at 150° C., at 10.5 bars and the second separation process is performed. During the entire process, the mixer of the reactor is operated. The structure obtained after the second cooling process applied in the reactor, is separated by the effect of gravity in the filtration system, separation is ensured by paying attention to the conditions of filter paper such as tearing and passing solid particles (filtering).

Polymerization Reaction of the Cellulose, which is Degraded in the Reactor:

The liquid component obtained from these processes is transferred to glass beakers in volumes of 2 L. 4 ml of glycerin or 6.5 ml of sorbitol and antimicrobial agent (oleuropein) are added to each 2 L liquid component and the component is placed in the heater.

Heating:

In order for the polymerization reaction to occur, 2 ml of cellulosic material, 4 ml of glycerin or 6.5 ml of sorbitol and oleuropein are added into the heater. The heater is set at 300° C. and 600 Rpm mixing speed and stirred for 2 hours. After 2 hours of mixing, a pulp structure is obtained and this structure is left to cool.

Obtaining Antimicrobial Agent from Olive Pit and Leaf:

During the heating phase, Oleuropein can be obtained as a whole from the olive itself, the pulp (pomace), the oil and the waste (alperujo) produced in the olive oil production systems with two decanters. Phenolic compounds in olive vary according to the method of agricultural cultivation. In addition, olive leaves prevent hypertension and have hypoglycemic, antiseptic and diuretic properties. The most important compound in olive leaf having these properties is oleuropein. There are very few or underdeveloped methods for extracting biophenols from olive leaves rich in oleuropein. The ethanol/water mixture is used as solvent in the method of randall extraction. Solution of 50 ml of ethanol-water mixture prepared in 70% ratio is transferred to the beaker in the solvent part in the randall system. 10 g of ground olive leaf or olive pit powder is transferred into the cartridge. Afterwards, the randall system is operated in the temperature range of 75-100° C. The extraction process is finished and the folic acid derivatives in the sample are available such that they are dissolved in ethanol. Distillation is then carried out to decompose ethanol and folic acid derivatives. The decomposed oleuropein is added to the heater part during the plasticizing step. All of the ingredients are mixed and left to cool.

Drying the Product:

The product, which is left to cool under room temperatures for 2 hours, is left to dry in the oven at 65° C. for 24 hours.

Grinding:

The dried biopolymers are placed in the grinder for grinding to be at least 50 microns in size and the particulate structure obtained after grinding is subjected to the screening process. The biopolymers which become particles by sieving are separated, according to their micron levels.

By the Method Developed:

not only plastic wastes are eliminated, but also environmentally friendly bioplastic granules are produced that utilize olive pit waste and prevent food waste and increase the shelf life of foods, the bioplastics that are developed begin to disappear in nature within 1 year, bioplastic cost is reduced by 60%, with the invention that is antimicrobial, the problem of food waste use of food preservatives that have negative effect on human health have been reduced by increasing the shelf life of foods, the bioplastics obtained can provide the desired properties for many products in the plastic industry and can be used in many sectors by means of their resistance to high temperature.

What is claimed is:

1. A method for producing bioplastic granules, comprising the process steps of:

mixing 4 kg of a dry olive pit waste (prina) with a 0.9 M 16 L NaOH solution to obtain a first mixture and transferring the first mixture to a reactor, and increasing a temperature gradually to 150° C., stirring the first mixture by fixing a pressure to 9.5 bars, cooling the first mixture contained in the reactor to obtain a cooled mixture, obtaining a solid cellulose by separating the cooled mixture by a filtering method, wherein a hemicellulose structure and a lignin structure are available in a dissolved state in the NaOH solution, and the hemicellulose structure and the lignin structure are obtained from the olive pits and are available in the cooled mixture, washing the solid cellulose in part with distilled water, combining the solid cellulose and treating the solid cellulose with 0.52 M 8 L $H_2SO_4$ with a gradual heating at 150° C. at 10.5 bars in the reactor to obtain a second mixture, cooling the second mixture, separating a cellulosic part and a shredded, dissolved the cellulose part from each other in the second mixture by using a filtering paper after the cooling to obtain a separated liquid component, wherein the cellulosic part is the pellet part in the second mixture and the shredded, dissolved cellulose part is polymerized, transferring the separated liquid component to glass beakers with a volume of 2 L, adding 4 ml of the glycerin or 6.5 ml of the sorbitol and the antimicrobial agent (oleuropein) to each liquid component of 2 L and placing the each liquid component in the heater, setting the heater to 300° C. and a mixing speed of 600 Rpm and obtaining a pulp structure as a result of the polymerization reaction of the shredded, dissolved cellulose part after mixing for 2 hours, leaving the pulp structure to cool at the room temperature to obtain a cooled pulp structure, and drying the cooled pulp structure in an oven at 65° C. for 24 hours.

2. The method according to claim 1, wherein the oleuropein added into the separated liquid component in the polymerization step is obtained by the process steps of:

transferring a solution of 50 ml of ethanol-water mixture prepared in 70% ratio to a beaker in a solvent part of a randall system, transferring 10 g of a ground olive leaf or an olive pit powder into a cartridge, operating the randall system in a temperature range of 75 to 100° C.

dissolving of folic acid derivatives in ethanol after an extraction, and carrying out a distillation to decompose the ethanol and the folic acid derivatives.

3. The method according to claim 2, wherein dried biopolymers are grinded to have a size of 5 microns.

4. The method according to claim 2, wherein dried biopolymers are grinded to have a size of 5 microns.

5. The method according to claim 2, wherein biopolymers obtained are used in a plastic sector as a raw material.

6. The method according to claim 2, wherein biopolymers obtained are used in a plastic sector as a raw material.

7. The method according to claim 4, wherein biopolymers obtained are used in a plastic sector as a raw material.

* * * * *